United States Patent [19]
Oberthur

[11] 3,892,445
[45] July 1, 1975

[54] LOAD-DEPENDENT BRAKE PRESSURE PROPORTIONING VALVE

[75] Inventor: Heinrich Oberthur, Offenbach-Rumpenheim, Germany

[73] Assignee: ITT Industries, Inc., New York, N.Y.

[22] Filed: Nov. 15, 1973

[21] Appl. No.: 416,339

[30] Foreign Application Priority Data
Dec. 15, 1972 Germany............................ 2261381

[52] U.S. Cl............................................. 303/22 R
[51] Int. Cl............................................. B60t 8/22
[58] Field of Search........ 303/6 R, 6 C, 22 A, 22 R, 303/24 C, 24 F; 188/195

[56] References Cited
UNITED STATES PATENTS
| | | | |
|---|---|---|---|
| 3,290,882 | 12/1966 | Oberthur | 303/22 R |
| 3,768,876 | 10/1973 | Lewis | 303/22 R |

*Primary Examiner*—Duane A. Reger
*Attorney, Agent, or Firm*—John T. O'Halloran; Menotti J. Lombardi; Alfred C. Hill

[57] ABSTRACT

The valve includes a stepped piston having a pressure medium connection therein between the pressure medium input and a load-dependent control tappet. This pressure medium connection is integral with the valve and reduces the load-dependent control force necessary to actuate the valve.

2 Claims, 1 Drawing Figure

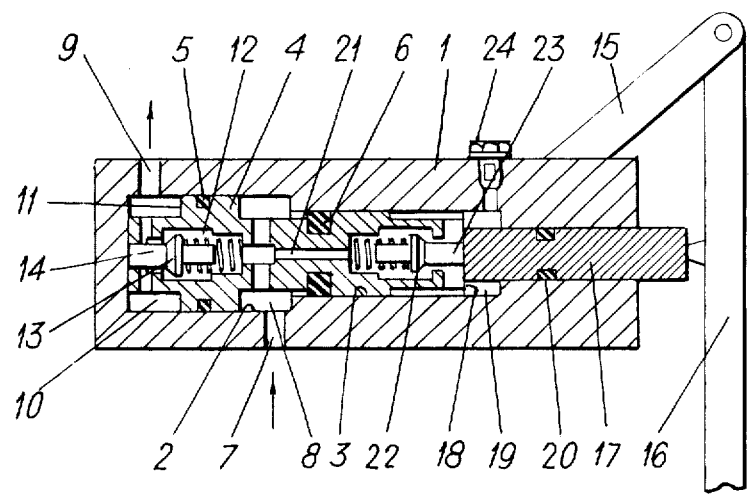

LOAD-DEPENDENT BRAKE PRESSURE PROPORTIONING VALVE

BACKGROUND OF THE INVENTION

This invention relates to a brake pressure proportioning valve including a stepped piston axially movable in a stepped cylinder, the switching point of the valve being controlled by means of introducing an axle load-dependent control force via a lever mechanism and a control tappet which controls the axial movement of the stepped piston.

Known load-dependent brake pressure proportioning valves have the disadvantage that high control forces are necessary for their actuation. These control forces result from the smaller surface of the stepped piston as well as the switching pressure. The load-dependent brake pressure proportioning valves are usually fastened to the vehicle body and are connected by a lever mechanism with the vehicle axle. Through the necessary control forces a force, which is supported by the vehicle axle, is transmitted during braking upon the vehicle body. Thus, the spring characteristics of the vehicle is unfavorably influenced and would reduce the road traction of the vehicle wheels when there are bumps in the roadway.

It is a further disadvantage of known load-dependent brake pressure proportioning valves that to introduce the load-dependent control force complicated lever mechanisms are necessary.

SUMMARY OF THE INVENTION

It is the object of the present invention to provide a load-dependent brake pressure proportioning valve, which is simple in construction and only requires low load-dependent control forces for its actuation.

A feature of the present invention is the provision of a brake pressure proportioning valve comprising a stepped cylinder having a pressure medium inlet and a pressure medium outlet to brakes to be controlled, a stepped piston disposed axially movable in the cylinder relative to the inlet and the outlet to proportion the pressure medium coupled to the outlet dependent upon the load of the axle having the brakes to be controlled, a control tappet disposed coaxially within the cylinder to control the axial movement of the piston dependent upon a force applied to the control tappet proportional to the axle load, a lever mechanism connected to the control tappet to apply the force thereto, and a first pressure medium connection disposed within the piston to interconnect the control tappet and the inlet.

In an advantageous embodiment of this invention, the control tappet is slidingly sealed to the stepped cylinder and introduced into a pressure chamber in the stepped cylinder in front of the smaller front surface of the stepped piston. The control tappet has a smaller cross-section than the front surface of the stepped piston. Moreover between the pressure chamber and a pressure medium supply line of the brake pressure proportional valve a pressure medium connection is arranged, which is controlled by a closing element. The closing element has a valve tappet in physical contact with the control tappet so the pressure medium connection opened only when the valve tappet is shifted by the control tappet.

Through the above construction of the load-dependent brake pressure proportioning valve of this invention, it is possible to obtain, by use of a very simple lever mechanism, a great transmission ratio between the load-dependent control force and the axial force acting upon the stepped piston. The arrangement of a pressure medium connection between the control tappet and the stepped piston requires no additional parts as compared with known brake pressure proportioning valves. Also the construction of the proportioning valve according to this invention does not change the operating security of the brake pressure proportioning valve.

By means of the pressure medium connection between the pressure chamber in front of the control tappet and the pressure medium supply line, it is ensured that the pressure chamber is always filled with fluid.

By disposing a closing element in the pressure medium connection between the pressure chamber and the pressure medium supply line, it is ensured that this pressure chamber is filled with pressure medium when the brake is actuated until the control tappet has moved away from the stepped piston far enough to enable the closing element to close the pressure medium connection. Up to this point the stepped piston is pressure balanced.

BRIEF DESCRIPTION OF THE DRAWING

The above-mentioned and other features and objects of this invention and the manner of obtaining them will become more apparent by reference to the following description taken in conjunction with the drawing, the simple FIGURE of which illustrates a longitudinal cross-section view of a load-dependent brake pressure proportioning valve in accordance with the principles of the present invention.

DESCRIPTION OF THE PREFERRED EMBODIMENT

The FIGURE shows a stepped cylinder 1 having a cylinder chamber 2 and a cylinder chamber 3 with chamber 2 having a larger cross-section than chamber 3. In chambers 2 and 3, there is disposed a stepped piston 4 which in the usual way is sealed with seals 5 and 6 to the inner surface of stepped cylinder 1.

Stepped cylinder 1 has a pressure medium inlet 7, which opens into a pressure medium chamber 8 in the cylinder chamber 2. Pressure medium chamber 8 is disposed adjacent chamber 3 of stepped cylinder 1 having the smaller cross-section. A pressure medium outlet 9 connects a pressure medium chamber 10 in stepped cylinder 1 in front of the larger front surface 11 of stepped piston 4 with the brake cylinders of the brake device, not shown here.

In the usual manner stepped piston 4 has a pressure medium passage 12 by which there is a connection between the pressure medium chamber 8 and 10. In the pressure medium passage 12 is disposed a closing element 13 having a valve tappet 14. Pressure medium passage 12 can be closed by closing element 13 in the known manner.

At stepped cylinder 1, there is arranged a fishplate 15 from which a lever mechanism 16 is supported. By lever mechanism 16 an axially directed force can actuate via a control tappet 17 upon stepped piston 4. For this purpose and according to this invention, there is formed in front of the smaller front surface 18 of stepped piston 4 a pressure chamber 19 and control tappet 17 is sealed with seal 20 to the inner surface of stepped cylinder 1.

In order to fill pressure chamber 19 with pressure medium, a pressure medium connection 21 is disposed in stepped piston 4 between pressure medium inlet 7 and pressure chamber 19. In pressure medium connection 21, exactly as in pressure medium passage 12, a closing element 22 is disposed, which has a valve tappet 23 in contact with control tappet 17. In addition, pressure chamber 19 has a venting screw 24.

The load-dependent brake pressure proportioning valve according to this invention is fastened in the usual manner to the vehicle body, while lever mechanism 16 is connected to that vehicle axle whose brakes are to be controlled load-dependently. The above-described load-dependent brake pressure proportional valve operates as follows.

In the drawing the brake pressure proportioning valve is shown in unactuated position. When the brakes are actuated, pressure medium flows from pressure medium inlet 7 through pressure medium passage 12 around closing element 13 into pressure medium chamber 10 and from there via pressure medium outlet 9 to the brake cylinders, not shown here.

At the same time, pressure medium flows from pressure medium inlet 7 via pressure medium connection 21 around closing element 22 into pressure chamber 19 and moves control tappet 17 to the right in stepped cylinder 1. As soon as control tappet 17 has moved a sufficient distance from the smaller front surface 18 of stepped piston 4, closing element 22 closes pressure medium connection 21 to pressure medium inlet 7. Now a force corresponding to the axle load operates via lever mechanism 16 and control tappet 17 upon the pressure medium in pressure medium chamber 19. The force control tappet 17 supplies to chamber 19 will be transferred to the smaller front surface 18 of stepped piston 4 in the ratio of the area of the transverse end surface of control tappet 17 to the area of surface 18 of stepped piston 4 and prevents stepped piston 4 from moving in a direction toward control tappet 17 (to the right when viewing the drawing). When the pressure in pressure medium inlet 7 and consequently also pressure medium outlet 9, is increased piston 4 tends to move to the right when viewing the drawing. However, a slight movement to the right will cause closing element 22 to be opened again and a higher pressure to be built up in chamber 19 through connection 21, thus, preventing piston 4 from moving further to the right when viewing the drawing. Free flow pressure medium through the brake pressure proportioning valve is thus insured. Only when a sufficiently high pressure exists in pressure medium chamber 10, i.e., when the so-called switching pressure is reached, will the force acting to the right on surface 11 of piston 4 be large enough to overcome the force of control tappet 17 and the pressure in chamber 8 acting to the left when viewing the drawing to cause piston 4 to move to the right when viewing the drawing. When this occurs closing element 13 will then cut off the connection between inlet 7 and outlet 9.

From this point on the pressure medium transmission between pressure medium inlet 7 and pressure medium outlet 9 takes place in the ratio of the area of the pressure-actuated transverse end surface of stepped piston 4 in chamber 10 to the area of the annular transverse pressure-actuated surface of piston 4 in chamber 8 defined by the difference between the diameters of chambers 2 and 3.

While I have described above the principles of my invention in connection with specific apparatus, it is to be clearly understood that this description is only made by way of example and not as a limitation to the scope of my invention as set forth in the objects thereof and in the accompanying claims.

I claim:

1. A brake pressure proportioning valve comprising:
   a stepped cylinder having a pressure medium inlet and a pressure medium outlet to brakes to be controlled;
   a stepped piston disposed axially movable in said cylinder relative to said inlet and said outlet to proportion the pressure medium coupled to said outlet dependent upon the load of the axle having said brakes to be controlled;
   a control tappet disposed coaxially within said cylinder to control the axial movement of said piston dependent upon a force applied to said control tappet proportional to said axle load, said control tappet having a smaller diameter than the adjacent end of said piston;
   a lever mechanism connected to said control tappet to apply said force thereto; and
   a first pressure medium connection disposed internally of said piston to interconnect said control tappet and said inlet and to apply pressure medium to the end of said control tappet adjacent said piston to improve the control action of said control tappet.

2. A valve according to claim 1, wherein
   said stepped cylinder includes
     a first cylindrical chamber having a first given diameter,
     a second cylindrical chamber having a second given diameter greater than said first given diameter, and
     a first transverse wall interconnecting said first and second chambers;
   said stepped piston includes
     a first portion slidably sealed to the inner surface of said second chamber,
     a second portion slidably sealed to the inner surface of said first chamber, and
     a second transverse wall interconnecting said first and second portions;
   said inlet is connected to a third chamber disposed between said first portion and said first chamber;
   said outlet is connected to a fourth chamber disposed between said first portion and an end wall of said second chamber;
   said inlet and said outlet are interconnected by a second pressure medium connection disposed within said stepped piston;
   said second connection has disposed therein a first closing element having a first valve tappet in contact with said end wall;
   a fifth chamber is disposed within said second chamber adjacent one end of said second portion spaced from said first portion;
   said control tappet extends axially through said cylinder in a slidably sealed relation into said fifth chamber, said control tappet having a smaller cross-section than the cross-section of said one end of said second portion; and
   said first pressure medium connection has a second closing element having a second valve tappet in contact with said control tappet in said fifth chamber, said first pressure medium connection being opened when said control tappet shifts said second closing element to an open position.

* * * * *